United States Patent
Choy

(10) Patent No.: US 11,366,585 B2
(45) Date of Patent: Jun. 21, 2022

(54) VARIABLE DISPLAY ORIENTATION BASED ON USER UNLOCK METHOD

(71) Applicant: Samsung Electronics Company, Ltd., Suwon (KR)

(72) Inventor: David Ming Choy, Vancouver (CA)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 973 days.

(21) Appl. No.: 14/696,306

(22) Filed: Apr. 24, 2015

(65) Prior Publication Data

US 2016/0313909 A1 Oct. 27, 2016

(51) Int. Cl.
| | |
|---|---|
| *G06F 3/048* | (2013.01) |
| *G06F 3/04883* | (2022.01) |
| *G06F 3/04845* | (2022.01) |
| *G06F 3/04847* | (2022.01) |
| *G09G 5/00* | (2006.01) |

(52) U.S. Cl.
CPC ...... *G06F 3/04883* (2013.01); *G06F 3/04845* (2013.01); *G06F 3/04847* (2013.01); *G06F 2203/04808* (2013.01); *G09G 5/00* (2013.01); *G09G 2340/0464* (2013.01); *G09G 2340/0492* (2013.01); *G09G 2354/00* (2013.01)

(58) Field of Classification Search
CPC .. G06F 3/048; G06F 3/04883; G06F 3/04845; G06F 3/04847; G06F 2203/04808; G09G 5/00; G09G 2340/0464; G09G 2340/0492; G09G 2354/00
See application file for complete search history.

(56) References Cited

U.S. PATENT DOCUMENTS

| | | | | |
|---|---|---|---|---|
| 2013/0027433 | A1* | 1/2013 | Hand | G06F 3/04817 345/650 |
| 2013/0191711 | A1* | 7/2013 | Tashman | G06F 17/211 715/205 |
| 2013/0265250 | A1* | 10/2013 | Ishikawa | G06F 3/041 345/173 |
| 2015/0109221 | A1* | 4/2015 | Wang | G06F 3/0488 345/173 |
| 2016/0224119 | A1* | 8/2016 | Wu | G06F 3/0488 |

\* cited by examiner

*Primary Examiner* — Pei Yong Weng
(74) *Attorney, Agent, or Firm* — Baker Botts L.L.P.

(57) ABSTRACT

In one embodiment, a method may include receiving a user input at an electronic device, the user input comprising a gesture associated with setting a screen orientation of the electronic device, wherein the electronic device is configured to recognize orientation-specific user input when entered from any one of a plurality of orientations. The method may include transitioning the electronic device from a first state to a second state, the second state being an active state. The method may then include changing the screen orientation based at least in part on an assessment of the user input, and displaying content on the electronic device based on the screen orientation.

12 Claims, 14 Drawing Sheets

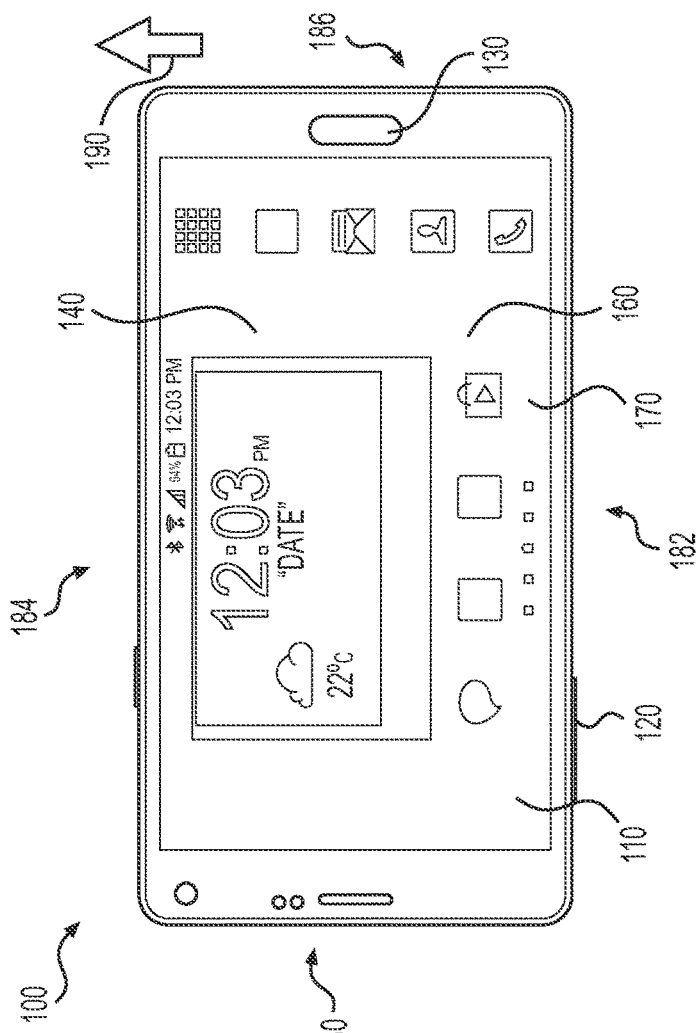
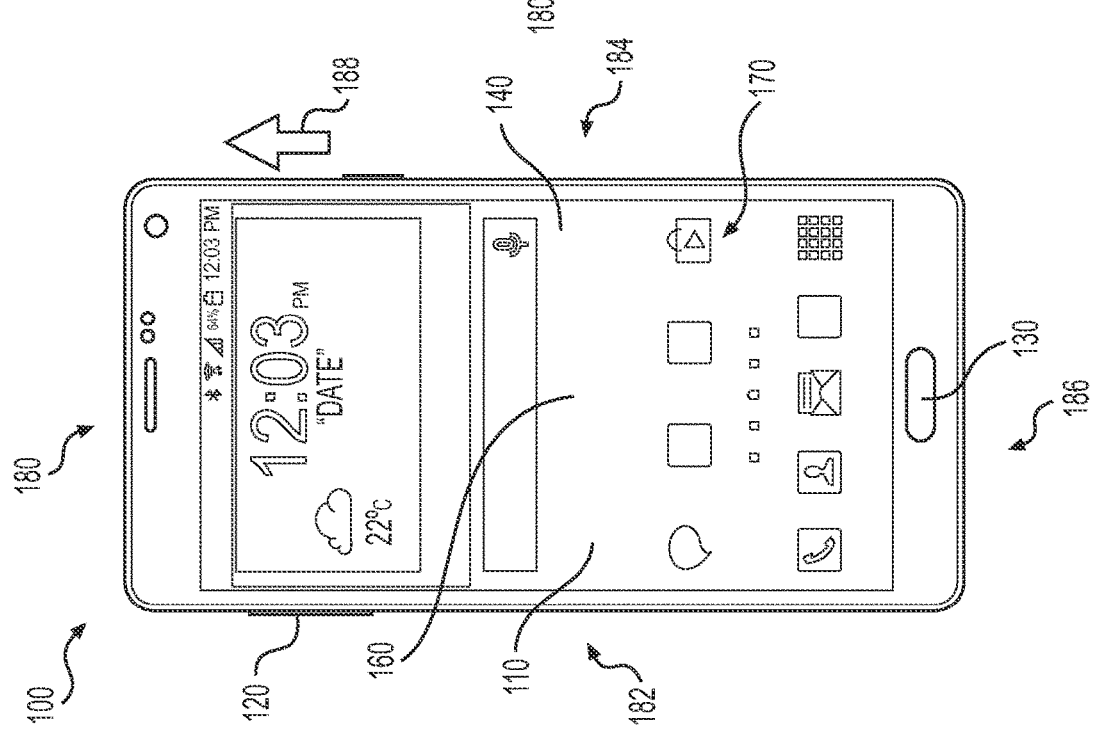
FIG. 1D
FIG. 1C

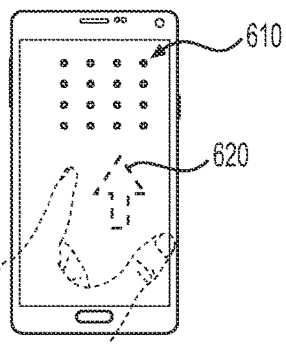
*FIG. 6A*
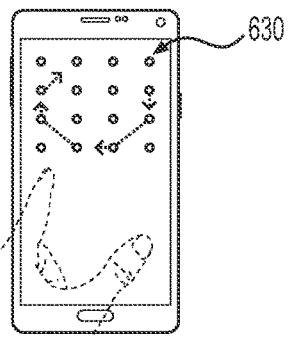
*FIG. 6B*
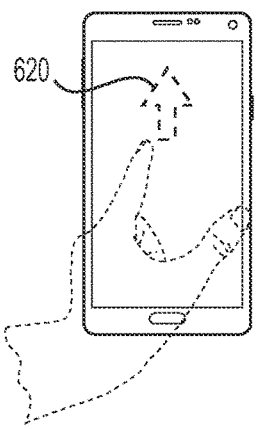 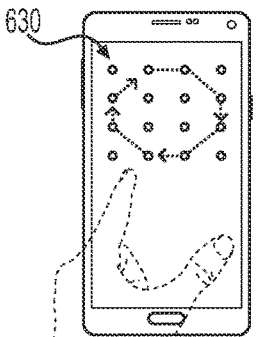 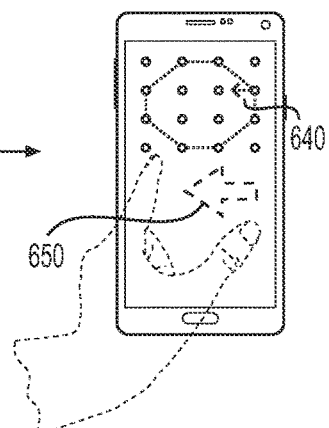
*FIG. 6D*  *FIG. 6C*  *FIG.6E*

VARIABLE DISPLAY ORIENTATION BASED ON USER UNLOCK METHOD

TECHNICAL FIELD

This disclosure generally relates to determining display orientation of a mobile computing device.

BACKGROUND

Electronic devices include displays that may be user interactive and receive user inputs. These electronic devices may include an omnidirectional display in which content on the electronic device may be displayed in any one of a number of directions on the screen of the device. These electronic devices may include a lock screen that requires a user input to "unlock" the device for use. In addition, these electronic devices may include a sensor (e.g., a gyroscope or accelerometer) that determines and/or maintains the orientation of the device, for example, based on the position and direction a user may be holding the device. In particular, the sensor may determine which way is "up" so that the electronic device is in the correct orientation when the user is interacting with the device.

BRIEF DESCRIPTION OF THE DRAWINGS

FIG. 1C illustrates electronic device 100 in an unlocked mode in a vertical orientation, and FIG. 1D illustrates electronic device 100 in an unlocked mode in a horizontal orientation.

FIGS. 6A-6E illustrate yet another example of a single-touch interaction for setting a screen orientation of an electronic device.

DESCRIPTION OF EXAMPLE EMBODIMENTS

System Overview

Figure 1B:
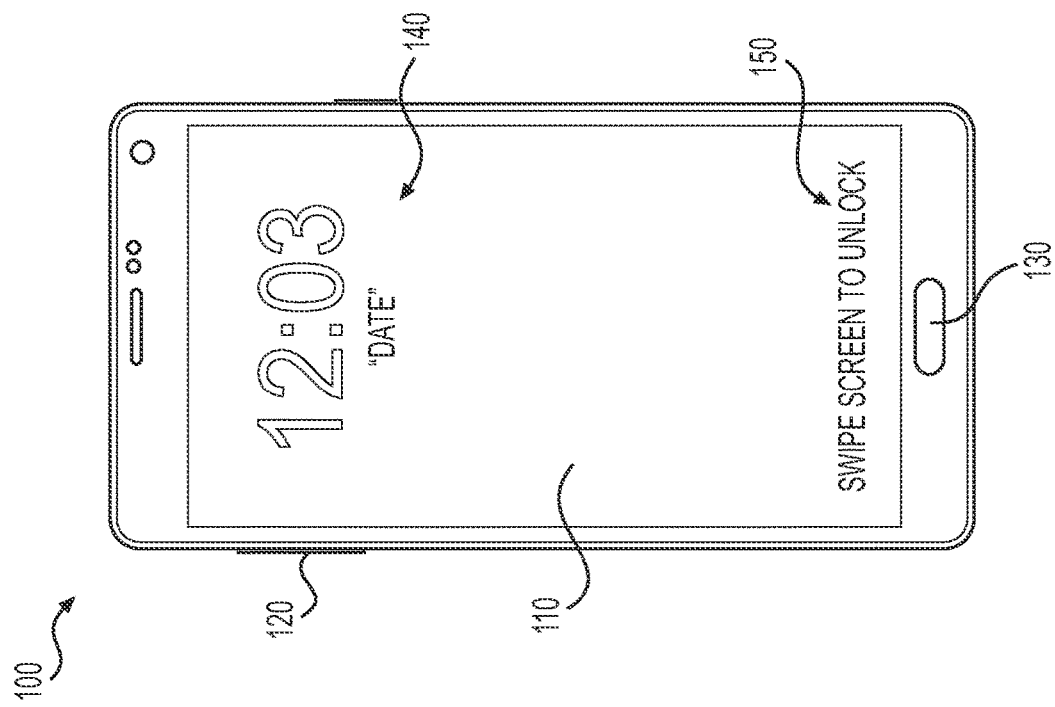
FIG. 1B illustrates electronic device 100 in a lockscreen mode.
Figure 1A:
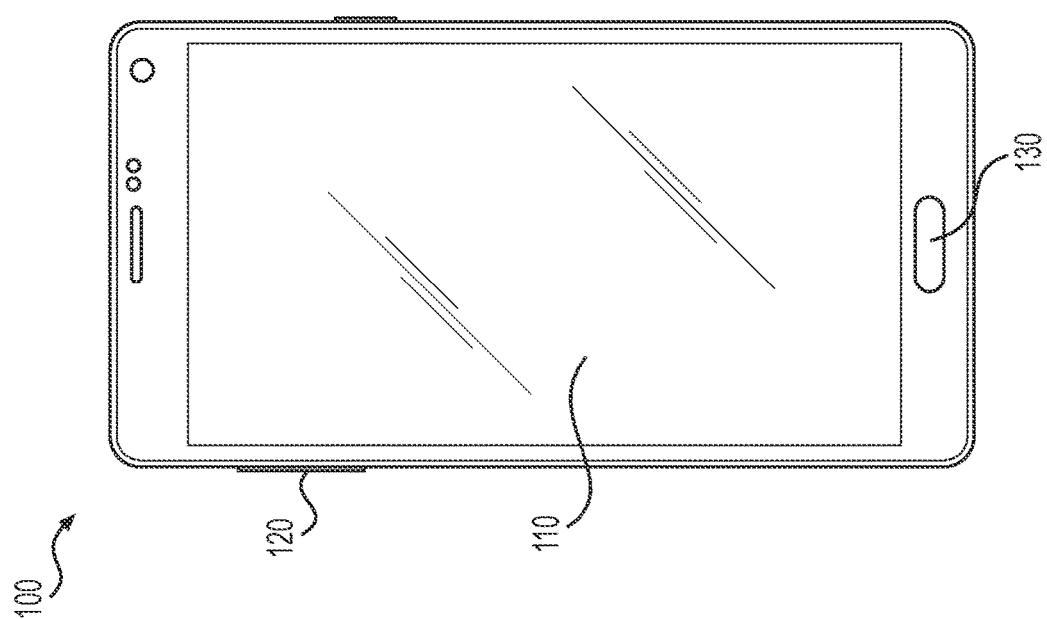
FIG. 1A illustrates an example electronic device 100.

FIG. 1A illustrates an example electronic device 100, FIG. 1B illustrates electronic device 100 in a lockscreen mode, FIG. 1C illustrates electronic device 100 in an unlocked mode in a vertical orientation, and FIG. 1D illustrates electronic device 100 in an unlocked mode in a horizontal orientation. In particular embodiments, electronic device 10 may include a computer system such as a mobile electronic device, mobile communication device, cellular telephone, smartphone, tablet device, laptop computer, notebook computer, surface computer, personal digital assistant (PDA), audio/video player, e-book reader, global positioning system (GPS) device, camera, other suitable electronic device, or any suitable combination thereof. In particular embodiments, electronic device 100 may include a processor, a power source (e.g., a battery) and/or a power source port for connecting to a power source (e.g., a power outlet), a wireless device for sending or receiving information using a wireless communication protocol (e.g., BLUETOOTH, WI-FI, or cellular), one or more sensors, one or more speakers, any other suitable components, or any combination thereof. The one or more sensors may include a touch sensor configured to recognize a user interaction with screen 110, a gyroscope and/or accelerometer configured to determine an orientation of screen 110, other suitable sensors, or any combination thereof. In particular embodiments, display device 100 may include a screen 110, a power button 120, and a home button 130. In particular embodiments, display device 100 may include a user interface (UI) 140 displayed on screen 110 and connected to the processor. Screen 110 may be configured to display text, digital images, or video. Screen 110 may be configured to be user interactive (e.g., recognize and accept user inputs to interact with device software). Screen 110 may include any suitable type of display, for example, an electrophoretic display, a liquid crystal display (LCD), a light-emitting diode (LED) display, an organic light-emitting diode (OLED) display, an organic field-effect transistor (OFET) display, or other suitable display. This disclosure contemplates any suitable type of display configured to be user interactive.

In particular embodiments, as shown in FIG. 1A, electronic device 100 may initially be in an inactive mode, such as for example, a powered-off mode, a sleep mode, a hibernation mode, other suitable inactive and/or powered-off mode, or any suitable combination thereof. In particular embodiments, while electronic device 100 is in the inactive mode, screen 110 may not be user interactive (e.g., a user input to interact with screen 110 may not be recognized or accepted by electronic device 100). In particular embodiments, electronic device 100 may be configured to transition from the inactive mode to a powered-on mode, as shown in FIG. 1B. As an example and not by way of limitation, the electronic device 100 may be configured to transition to the powered-on mode by a user pressing power button 120 for a predetermined amount of time. In particular embodiments, the powered-on mode may initially display a lock screen on UI 140 of screen 110, which may include, for example, information such as the date and time. The lock screen may include a UI element 150 that regulates access to content on the device by, for example, requiring a user to perform a certain, predefined action in order to obtain access (e.g., as shown in FIG. 1B, "swipe screen to unlock"). UI element 150 may be displayed at a predetermined position on screen 110 (e.g., at a bottom half of screen 110). As an example and not by way of limitation, user action required to obtain access to content on electronic device 110 may include entering a password (e.g., numeric password, alphabetical password, or alphanumeric password), performing a gesture (e.g., a gesture on UI 140 while a user is touching screen 110, a gesture on UI 140 while a user is not touching screen 110, other suitable gesture, or any combination thereof), any other suitable user action, or any combination thereof. In particular embodiments, upon successful completion of the user action on the lock screen of UI 140 required to obtain access to content on electronic device 110, electronic device 100 may be transitioned from the powered-on mode displaying a lock screen to an unlocked mode, as shown in FIG. 1C. As an example and not by way of limitation, the unlocked mode may be a mode in which the user may access and interact with content on electronic device. In particular embodiments, the unlocked mode may display a homepage 160 with one or more user-interactive applications 170, information such as date, time, and temperature, and other suitable information.

In particular embodiments, when electronic device 100 is in the unlocked mode, UI 140 may be displayed in a particular orientation on screen 110 relative to electronic device 100. In particular embodiments, this particular screen orientation, in addition to the rotation and/or movement of electronic device 100, may be determined based on one or more sensors of electronic device 100. As an example and not by way of limitation, the one or more sensors may include one or more hardware sensors. In particular embodiments, the one or more sensors may include an accelerometer that may be configured to determine an angle at which electronic device 100 is tilted and an angle at which electronic device 100 is moving based on measuring acceleration forces, times, and/or directions; a gyroscope that may be configured to determine the rate of rotation of electronic device 100 around a particular axis of rotation; a magnetometer that may be configured to measure the direction of magnetic fields to determine the direction of the earth's geomagnetic vector; other suitable orientation and/or motion sensor; or any suitable combination thereof. Although this disclosure describes particular sensors for determining particular screen orientations, this disclosure contemplates employing any suitable sensors for determining any suitable parameters for determining a screen orientation.

In particular embodiments, how electronic device 100 is positioned before a user may determine an "up" direction that is relative to the position of the device, as well as a "down" direction, a "left" direction, and a "right" direction that are also relative to the position of the device before the user. As an example and not by way of limitation, when electronic device 100 is positioned before a user in the position shown in FIG. 1C (e.g., in a portrait orientation), the direction of "up" may correspond to a portion 180 of electronic device 100 being at a higher position than a portion 186 of electronic device 100 when electronic device 100 is positioned upright to be substantially parallel to a user, or portion 180 being at a farther distance than portion 186 from a position of the user viewing electronic device 100 when electronic device 100 is positioned to be substantially perpendicular or at an angle in front of the user, such as when electronic device 100 is lying on a surface (e.g., a table surface) in front of the user. As an example and not by way of limitation, when electronic device 100 is positioned before a user in the position shown in FIG. 1C, the direction of "left" may correspond to the direction of a portion 182 relative to a portion 184 of electronic device 100, and the direction of "right" may correspond to the direction of portion 184 relative to portion 182 of electronic device 100. Similarly, as an example and not by way of limitation, when electronic device 100 is positioned before the user in the position shown in FIG. 1D (e.g., in a landscape orientation), the direction "up" may correspond to portion 184 being at a higher position than portion 182 when electronic device 100 is positioned upright to be substantially parallel or to the user, or portion 184 being at a farther distance than bottom portion 182 from the position of the user viewing electronic device 100 when electronic device 100 is positioned to be substantially perpendicular or at an angle in front of the user. In addition, as an example and not by way of limitation, when electronic device 100 is positioned before the user in the position shown in FIG. 1D, the direction of "left" may correspond to the direction of portion 180 relative to portion 186 of electronic device 100, and the direction of right may correspond to the direction of portion 186 relative to portion 180 of electronic device 100. In particular embodiments, the directions of "top," "down," "left," and "right" may be similarly determined for all types of computer systems such as a mobile electronic device, mobile communication device, cellular telephone, smartphone, tablet device, laptop computer, notebook computer, surface computer, personal digital assistant (PDA), audio/video player, e-book reader, global positioning system (GPS) device, camera, other suitable electronic device based on the position and orientation of the device relative to a user when the device is positioned in front of the user.

In particular embodiments, the one or more sensors (described above) may be configured to determine an "up" direction (and the corresponding opposite "down" direction), as well as a "left" direction and a "right" direction. In particular embodiments, as shown in FIG. 1C, the one or more sensors may determine that the "up" direction is a direction shown by arrow 188. As an example and not by way of limitation, the one or more sensors may determine the "up" direction of arrow 188 based on the position and/or orientation a user is holding electronic device 100 in front of them, for example, when the user is holding electronic device 100 in an upright manner and a vertical portrait orientation to view content on electronic device 100. Thus, the UI 140 may be displayed corresponding to this "up" direction of arrow 188 (e.g., the top portion of UI 140 may be displayed substantially on portion 180, the bottom portion of UI 140 may be displayed substantially on portion 186, the left portion of UI 140 may be displayed substantially on portion 182, and the right portion of UI 140 may be displayed substantially on portion 184). In addition, all words, characters, and symbols displayed on UI 140, in addition to the orientation of all user-interactive applications 170, are displayed according to the orientation of the "up" direction of arrow 188. In particular embodiments, when electronic device 100 is moved to a horizontal landscape orientation, as shown in FIG. 1D, the one or more sensors may determine that the "up" direction is a direction shown by arrow 190. As an example and not by way of limitation, the one or more sensors may determine the "up" direction of arrow 190 based on the position and/or orientation a user is holding electronic device 100 in front of them, for example, when the user is holding electronic device 100 in an upright manner and a horizontal landscape orientation to view content on electronic device 100. Thus, the UI 140 may be displayed corresponding to this "up" direction of arrow 190 (e.g., the top portion of UI 140 may be displayed substantially on portion 184, the bottom portion of UI 140 may be displayed substantially on portion 182, the left portion of UI 140 may be displayed substantially on portion 180, and the right portion of UI 140 may be displayed substantially on portion 186). In addition, all words, characters, and symbols displayed on UI 140, in addition to the orientation of all user-interactive applications 170, are displayed according to the orientation of the "up" direction of arrow 188.

In particular embodiments, the orientation of UI 140 on screen 100 may be adjustable such that the orientation of UI 140 may be changed depending on an orientation of electronic device 100 itself (e.g., depending on a determination of which direction is "up"). As an example and not by way of limitation, when electronic device 100 is moved from the vertical portrait position shown in FIG. 1C to the horizontal landscape position shown in FIG. 1D, and this movement is accessed by the one or more sensors, the orientation of UI 140 may shift from an "up" direction according to a direction of arrow 188 (FIG. 1C) to an "up" direction according to a direction of arrow 190 (FIG. 1D). In other word, the orientation of UI 140 may shift such that the top portion of UI 140 displayed substantially on portion 180 in FIG. 1C may shift to be displayed substantially on portion 184 in FIG. 1D, and the bottom portion of UI 140 displayed substantially on portion 186 in FIG. 1C may shift to be displayed substantially on portion 182 in FIG. 1D. In particular embodiments, as shown in FIGS. 1C and 1D, the locations of user-interactive applications 170 on homepage 160 may change based on whether electronic device 100 is in portrait orientation or landscape orientation, and thus may affect the positions of these user-interactive applications 170 after a shift has occurred. In addition, all words, characters, and symbols displayed on UI 140, in addition to the orientation of all user-interactive applications 170 themselves, are displayed according to the orientation of the "up" direction as determined by the one or more sensors. Although this disclosure describes a particular shifting movement and the resulting change in the screen orientation and UI components displayed on the screen, this disclosure contemplates employing any suitable shifting movement resulting in any suitable corresponding change in the screen orientation and UI components displayed on the screen.

Determination of Display Orientation Based on User Interaction

Figure 2:
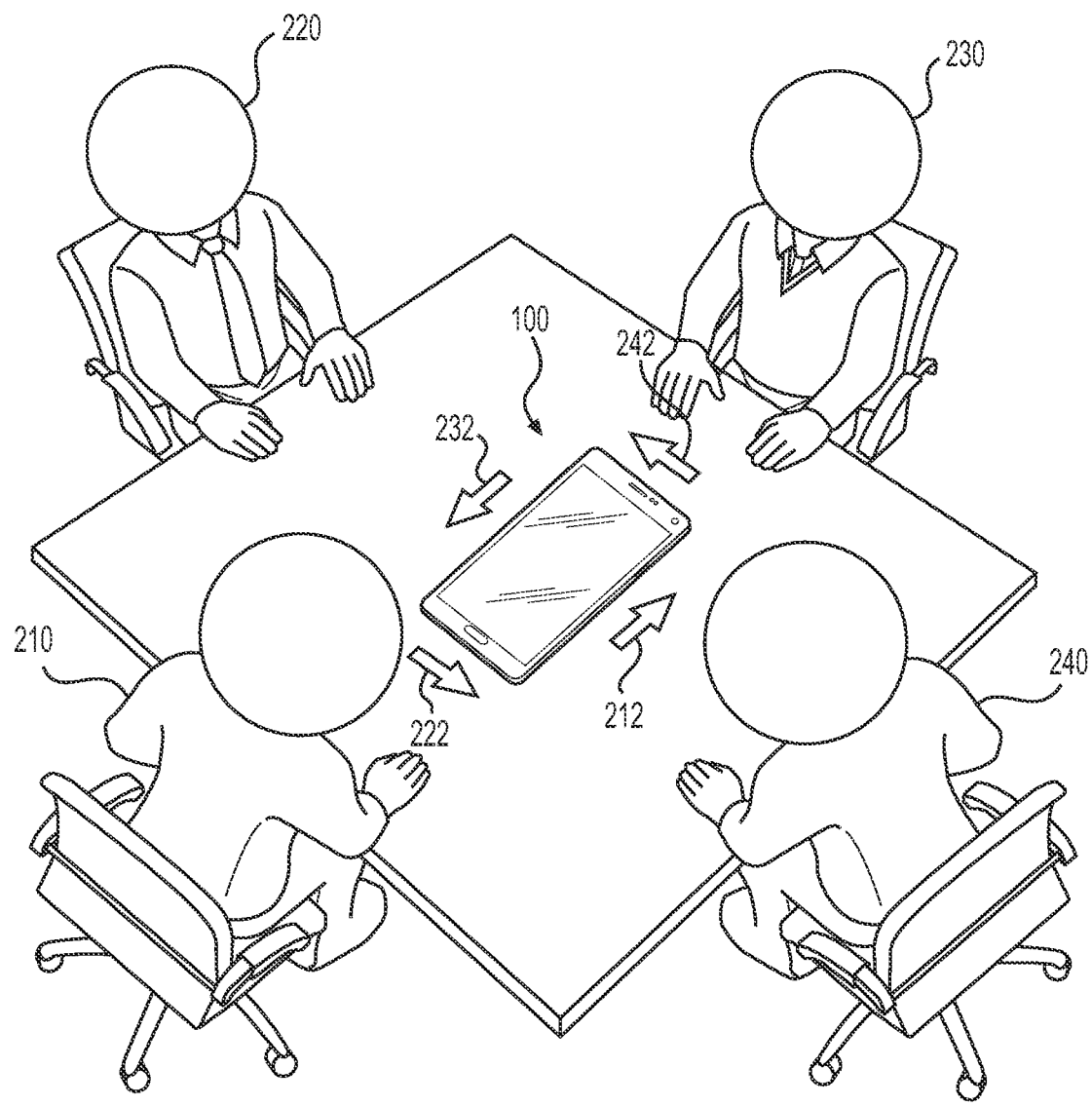
FIG. 2 illustrates an electronic device positioned on a table in front of four users located at four different positions around the electronic device.

In the above-described examples, the one or more sensors may determine the screen orientation based on the movement and/or rotation of electronic device 100. For example, as discussed above, when a user holds electronic device 100 in front of them in an upright manner and at a vertical and/or horizontal orientation, the one or more sensors may determine the screen orientation based on a determination of which direction is "up." However, when data from the one or more sensors is not applicable and/or not valid (e.g., the one or more sensors may not be able to determine the orientation of electronic device 100 because the device is laying on a flat surface), electronic device 100 may determine the orientation by means other than using the one or more sensors. As an example and not by way of limitation, electronic device 100 may use a default screen orientation to display UI 140, and this default screen orientation may be determined based on a pre-set default screen orientation and/or a previously-determined screen orientation (e.g., determined at the end of the last use of electronic device 100 by a user). However, using a default and/or previously-determined screen orientation may not be accurate in many situations. As an example and not by way of limitation, FIG. 2 illustrates electronic device 100 positioned on a flat surface (e.g., a table 200) in front of four users 210, 220, 230, 240 located at four different positions around the electronic device. Each of the four users 210, 220, 230, 240 may start from a lock screen on UI 140 of screen 110 (see FIG. 1B) during a discussion of content displayed on the device, and each of the four users 210, 220, 230, 240 may want to view the content in an orientation corresponding to their specific location around table 200 relative to electronic device 100. As shown in FIG. 2, first user 210 may want to view the content according to an orientation determined based on a direction of "up" corresponding to a direction of first arrow 212, second user 220 may want to view the content according to an orientation determined based on a direction of "up" corresponding to a direction of second arrow 222, third user 230 may want to view the content according to an orientation determined based on a direction of "up" corresponding to a direction of third arrow 232, and fourth user 240 may want to view the content according to an orientation determined based on a direction of "up" corresponding to a direction of fourth arrow 242. However, because electronic device 100 is immobile and lying flat on table 200, the one or more sensors may not receive any data regarding the movement and/or rotation of the device and thus may not be able to determine an orientation for the display screen of the device. Moreover, assuming that device 100 was previously displaying content based on the direction of "up" corresponding to a direction of arrow 212, if any of users 220, 230, or 240 start the device from the lock screen on UI 140 of screen 110, the starting orientation of screen 110 for each of users 220, 230, 240 would be initially incorrect, and these users would then need to correct the screen orientation in order to view content in the correct orientation relative to their position around electronic device 100. In these situations, the screen orientation may be determined based on a user interaction (e.g., a gesture) that sets a screen orientation for electronic device 100. As an example and not by way of limitation, the user interaction may be with a lock screen so as to set the screen orientation immediately before the user is able to interact with content on electronic device 100. As an example and not by way of limitation, these user interactions may be preconfigured (e.g., predefined by the device, the user, a third party, or other suitable entity) to each correspond to a specific screen orientation after the user unlocks electronic device 100 by the user interaction with the unlock screen. In particular embodiments, even if electronic device 100 can use a sensor-determined orientation to set a screen orientation upon transitioning from the first state to the second state (i.e., unlocking the device), a user may want to override this sensor-determined orientation, and instead use a user-defined orientation based on the user's unlocking interaction. For example, a user may be lying down in bed with the device held such that the sensor would determine the orientation to be perpendicular to the surface of the bed. However, the user may want to set a user-defined screen orientation to be parallel with the surface of the bed. In this situation, the user may want to use the unlocking interaction to override the initial screen orientation determined by the device's sensor and set a new, user-defined screen orientation after unlocking the device.

In particular embodiments, electronic device 100 may receive a user input including a gesture associated with setting a screen orientation of electronic device 100. In particular embodiments, electronic device 100 may be configured to recognize orientation-specific user input when entered from any one of a plurality of orientations. In particular embodiments, upon receiving the user input, electronic device 100 may transition from a first state to a second state, the second state being an active state. As an example and not by way of limitation, the first state may be an inactive mode (e.g., a powered-off mode, a sleep mode, a hibernation mode, other suitable suspended action and/or powered-off mode, or any suitable combination thereof, as discussed above and shown in FIG. 1A). As an example and not by way of limitation, the first state may be a powered-on mode such as a mode that initially displays a lock screen on the screen of the device that prohibits access to the content on electronic device 100 (e.g., as discussed above and shown in FIG. 1B). As an example and not by way of limitation, the second state may include an unlocked mode in which the user may access and interact with content displayed on the screen of electronic device 100 (e.g., as discussed above and shown in FIGS. 1C and 1D). In particular embodiments, the gesture associated with setting the screen orientation of electronic device 100 may be received by electronic device 100 while in the first state, and may result in electronic device 100 transitioning from the first state to the second state. In particular embodiments, the gesture may be orientation-specific such that certain gestures are associated with certain screen orientations of electronic device 100 while in the unlocked mode, and these gestures may be entered and received while electronic device 100 is in any one of a plurality of orientations (e.g., the gestures may be entered and received at any one of a number of locations around electronic device 100). In particular embodiments, electronic device 100 may include an interactive display screen. In particular embodiments, the gesture may include a user interaction in which the user directly touches display screen 110 of electronic device 100 with at least one of the user's fingers for a predetermined amount of time (as discussed below), a user interaction in which the user's fingers do not directly touch electronic device 100, any other suitable gesture, and any combination thereof. As an example and not by way of limitation, the gesture in which the user directly touches display screen 110 may include single-touch interactions (e.g., with only one finger), multi-touch interactions (e.g., with more than one finger), interactions involving a particular pressure exerted on display device 110 and/or electronic device 100 for a particular period of time, other interactive inputs, or any combination thereof. As an example and not by way of limitation, the gesture in which the user does not directly touch electronic device 100 may include 3D gestures (e.g., the device recognizes a user's 3D motion and interprets the motion as a user input), and/or other suitable interactions that do not involve directly touching display screen 110 and/or electronic device 100. As an example and not by way of limitation, the gestures may be used in conjunction with one or more other user inputs, and these user inputs may include any of the user interactions described in the embodiments of this disclosure. In particular embodiments, electronic device 100 may set the screen orientation in the second state based at least in part on an assessment of the user input, and then display content on the electronic device based on the screen orientation. As an example and not by way of limitation, the assessment of the user input may include a determination of the screen orientation associated with the gesture. As an example and not by way of limitation, the content may then be displayed on electronic device 100 based on the screen orientation associated with the gesture when electronic device 100 is in the unlocked mode. In particular embodiments, prior to receiving the user input, electronic device 100 may determine that the screen orientation may not be able to be accessed from at least a sensor of the electronic device.

Examples of Single-Touch Interactions

Figure 3A:
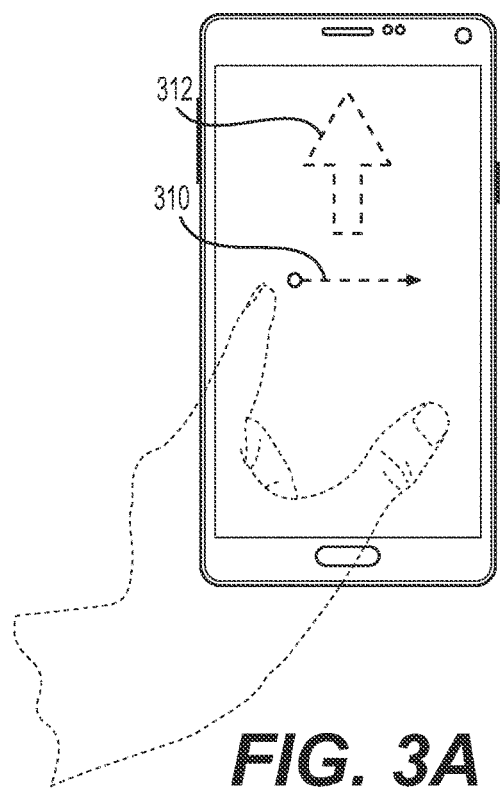
FIGS. 3A-3D illustrate an example of a single-touch interaction for setting a screen orientation of an electronic device.
Figure 3B:
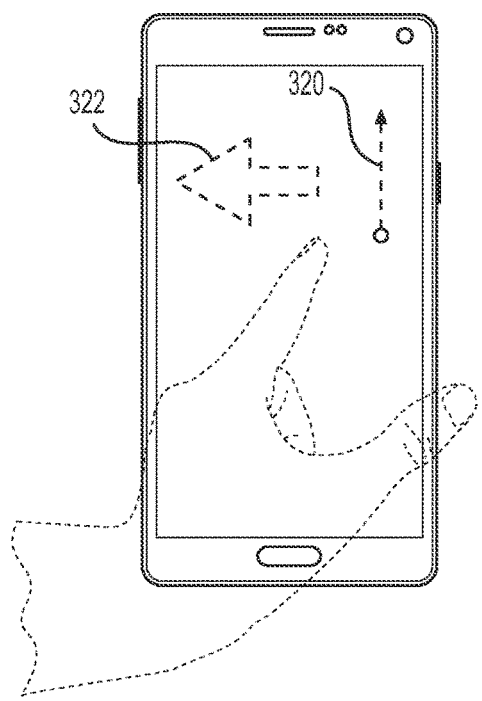
Figure 3C:
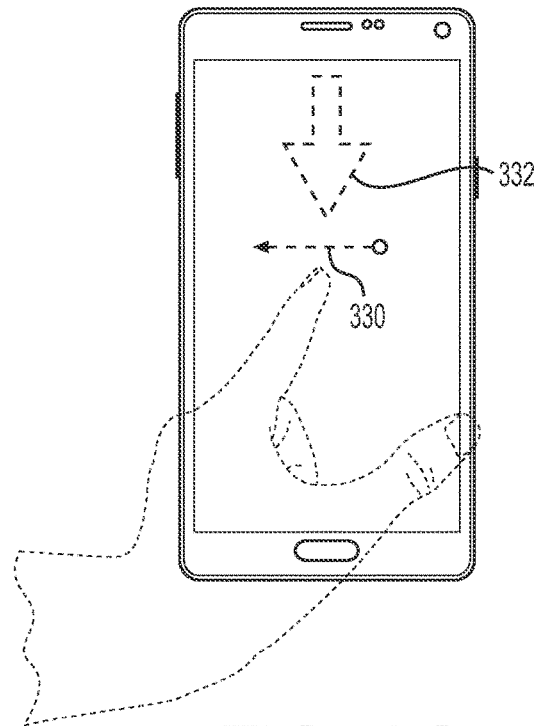
Figure 3D:
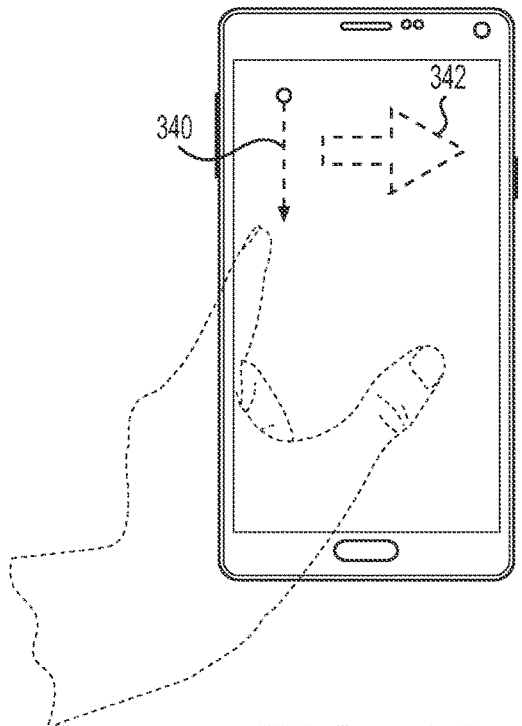
Figure 4A:
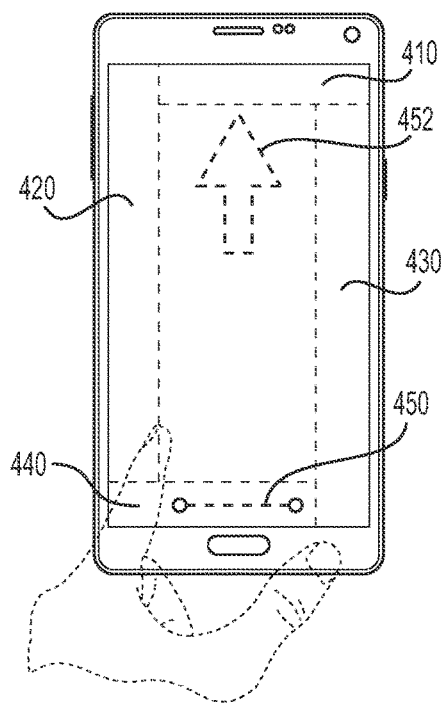
FIGS. 4A-4D illustrate another example of a single-touch interaction for setting a screen orientation of an electronic device.
Figure 4B:
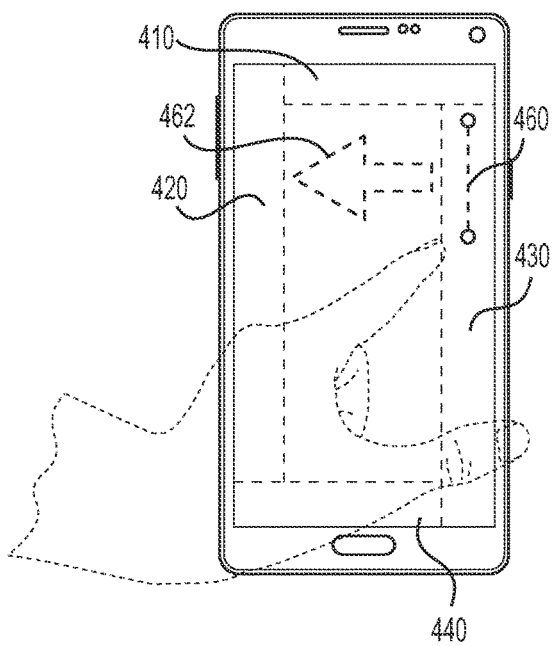
Figure 4C:
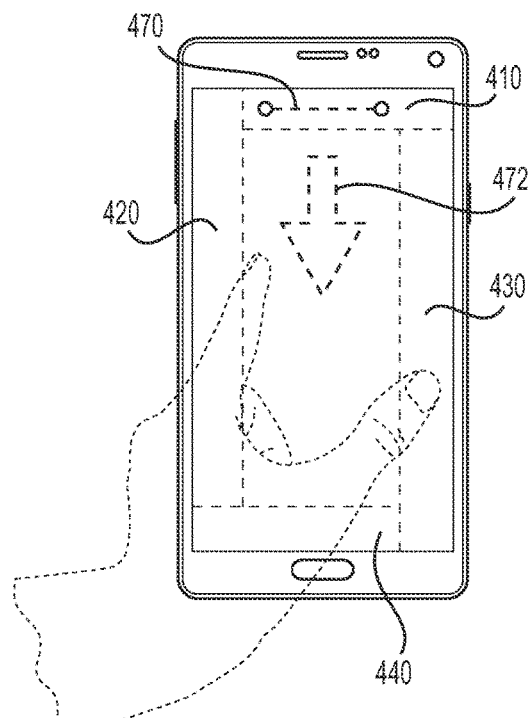
Figure 4D:
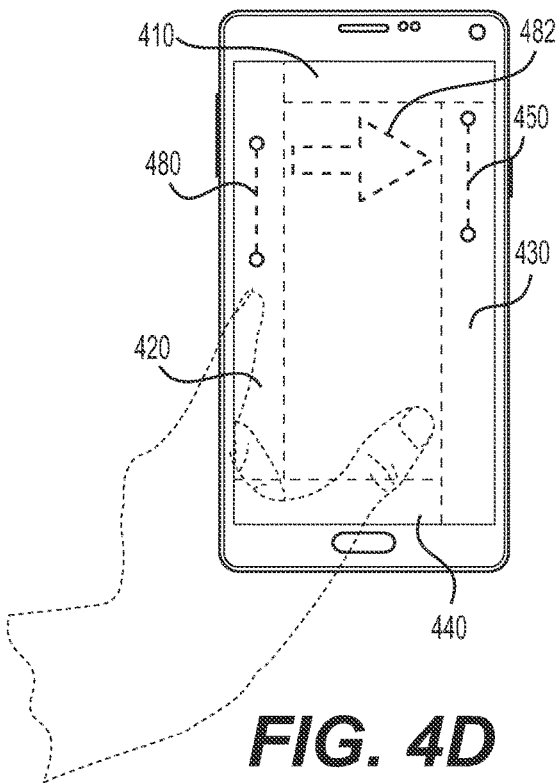

In particular embodiments, the gesture may include a single-touch interaction of the user with the display screen that is associated with setting the screen orientation of electronic device 100. As an example and not by way of limitation, a single-touch interaction may include a user interaction in which only one finger of the user interacts with at least a portion of the display screen. FIGS. 3A-8D illustrate examples of a single-touch interaction for setting a screen orientation of an electronic device. In particular embodiments, as shown in FIGS. 3A-3D, the single-touch interaction may include a swiping motion of the finger of the user in a particular direction on display screen 110 of electronic device 100 when the device is in the first state. In particular embodiments, the particular direction in which the user swipes display screen 110 may be associated with a desired screen orientation when electronic device 100 transitions to the second state. In particular embodiments, the swiping motion may include a single motion of the finger extending linearly in the particular direction. As an example and not by way of limitation, as shown in FIG. 3A, a first swiping motion 310 toward a right-side portion of display screen 110 (i.e., portion 184) may correspond to setting the screen orientation according to a direction of arrow 312 (i.e., the "up" direction is a 90 degree counterclockwise turn from first linear swiping motion 310). As shown in FIG. 3B, a second swiping motion 320 toward a top portion of display screen 110 (i.e., portion 180) may correspond to setting the screen orientation according to a direction of arrow 322 (i.e., the "up" direction is a 90 degree counterclockwise turn from second linear swiping motion 320). As shown in FIG. 3C, a third swiping motion 330 toward a left-side portion of display screen 110 (i.e., portion 182) may correspond to setting the screen orientation according to a direction of arrow 332 (i.e., the "up" direction is a 90 degree counterclockwise turn from third linear swiping motion 330). As shown in FIG. 4D, a fourth swiping motion 340 toward a bottom portion of display screen 110 (i.e., portion 186) may correspond to setting the screen orientation according to a direction of arrow 342 (i.e., the "up" direction is a 90 degree counterclockwise turn from fourth linear swiping motion 340). Although this disclosure describes a swiping direction to correspond to a particular screen orientation, this disclosure contemplates employing any suitable swiping direction to correspond to any suitable screen orientation.

In particular embodiments, the single-touch interaction may include a swiping motion of the finger of the user at a particular location on display screen 110 of electronic device 100 when the device is in the first state. In particular embodiments, when a swipe occurs close to an edge of display screen 110, the edge where the swipe is located may be set as the bottom of the display screen and the orientation of the screen may be set accordingly. In particular embodiments, display screen 110 may be delineated into a plurality of sections such that a swiping motion located in a particular section of the plurality of sections may be associated with a desired screen orientation when electronic device 100 transitions to the second state. As an example and not by way of limitation, as shown in FIGS. 4A-4D, display screen 110 may include four separately delineated sections 410, 420, 430, 440 in which section 410 may be located at or near a top part of display screen 110 (i.e., portion 180), section 420 may be located at or near a left part of display screen 110 (i.e., portion 182), section 430 may be located at or near a right part of display screen 110 (i.e., portion 184), and section 440 may be located at or near a bottom part of display screen 100 (i.e., portion 186). As shown in FIG. 4A, a first swiping motion 450 located in section 440 at or near the bottom part of display screen 110 may correspond to setting the screen orientation according to a direction of arrow 452 (i.e., section 440 containing first swiping motion 450 is set as the "bottom" of display screen 110). As shown in FIG. 4B, a second swiping motion 460 located in section 430 at or near the right part of display screen 110 may correspond to setting the screen orientation according to a direction of arrow 462 (i.e., section 430 containing second swiping motion 460 is set as the "bottom" of display screen 110). As shown in FIG. 4C, a third swiping motion 470 located in section 410 at or near the top part of display screen 110 may correspond to setting the screen orientation according to a direction of arrow 472 (i.e., section 410 containing third swiping motion 470 is set as the "bottom" of display screen 110). As shown in FIG. 4D, a fourth swiping motion 480 located in section 420 at or near the left part of display screen 110 may correspond to setting the screen orientation according to a direction of arrow 482 (i.e., section 420 containing fourth swiping motion 480 is set as the "bottom" of display screen 110). In particular embodiments, the swiping motion may be linear, nonlinear, or of other suitable form. Although this disclosure describes a location of a swiping motion to correspond to a particular screen orientation, this disclosure contemplates employing any suitable location of any suitable swiping motion to correspond to any suitable screen orientation.

Figure 5A:
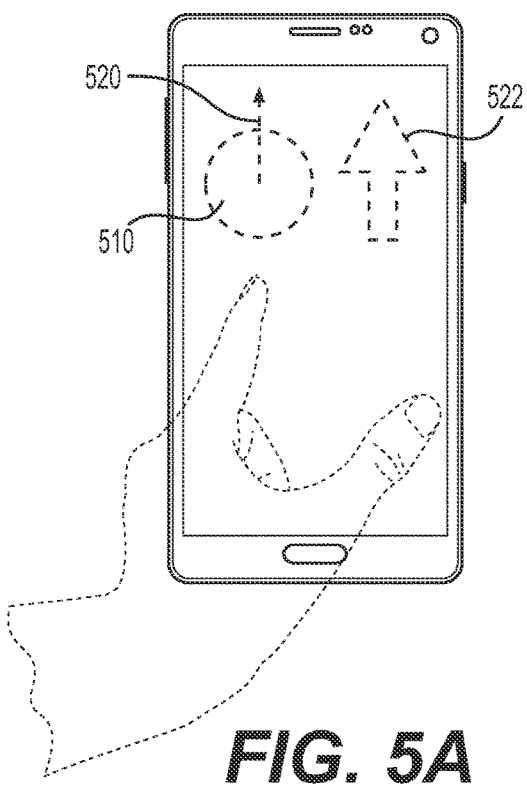
FIGS. 5A-5D illustrate yet another example of a single-touch interaction for setting a screen orientation of an electronic device.
Figure 5B:
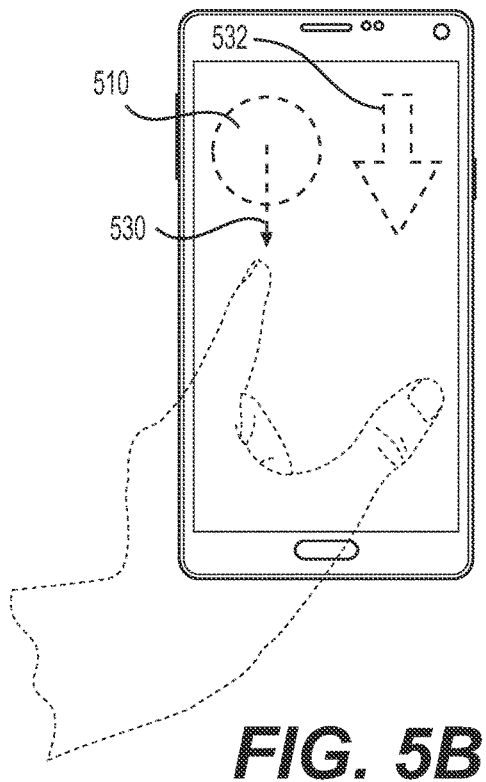
Figure 5C:
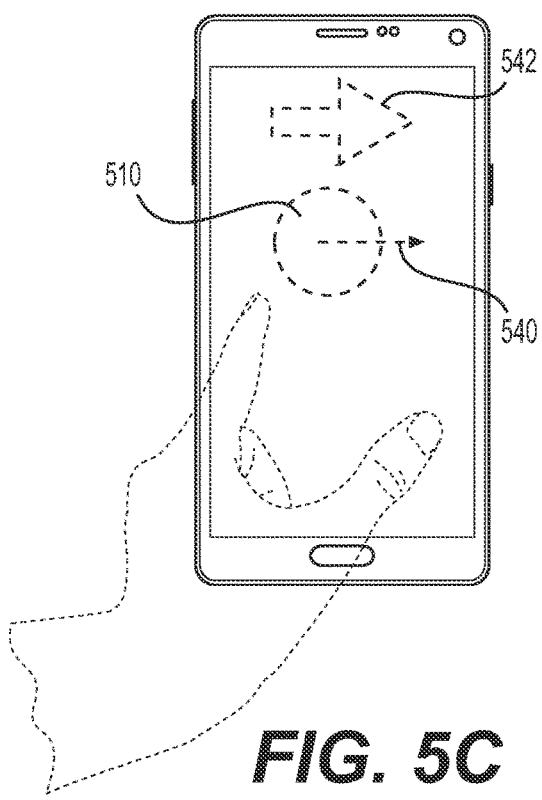
Figure 5D:
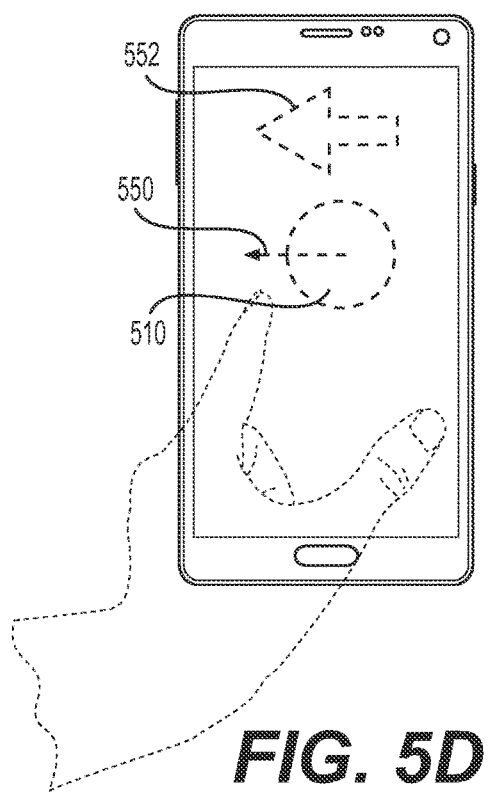

In particular embodiments, the single-touch interaction may include a swiping motion of the finger of the user in a particular direction and at a particular location on display screen 110 of electronic device 100 when the device is in the first state. In particular embodiments, a combination of a visual cue indicating a location where the swipe may start from and the direction of the swipe itself is associated with a particular screen orientation. As an example and not by way of limitation, the visual cue may be one or more geometric shapes displayed on display screen 110. As an example and not by way of limitation, as shown in FIGS. 5A-5D, display screen 110 may include a circular visual cue 510 that indicates an area on display screen 110 where the swipe may begin at. As shown in FIG. 5A, a first swiping motion 520 that initiates from circular visual cue 510 and moves in a direction toward a top part of display screen 110 (i.e., portion 180) may correspond to setting the screen orientation according to a direction of arrow 522 (i.e., setting the screen orientation according to an "up" direction). As shown in FIG. 5B, a second swiping motion 530 that initiates from circular visual cue 510 and moves in a direction toward a bottom part of display screen 110 (i.e., portion 186) may correspond to setting the screen orientation according to a direction of arrow 532 (i.e., setting the screen orientation according to a "down" direction). As shown in FIG. 5C, a third swiping motion 540 that initiates from circular visual cue 510 and moves in a direction toward a left part of display screen 110 (i.e., portion 184) may correspond to setting the screen orientation according to a direction of arrow 542 (i.e., setting the screen orientation according to a "right" direction). As shown in FIG. 5D, a fourth swiping motion 550 that initiates from circular visual cue 510 and moves in a direction toward a right part of display screen 110 (i.e., portion 182) may correspond to setting the screen orientation according to a direction of arrow 552 (i.e., setting the screen orientation according to a "left" direction). In particular embodiments, the swiping motion may be linear, nonlinear, or of other suitable form. Although this disclosure describes a position and location of a swiping motion to correspond to a particular screen orientation, this disclosure contemplates employing any suitable position and location of any suitable swiping motion to correspond to any suitable screen orientation.

Figure 7A:
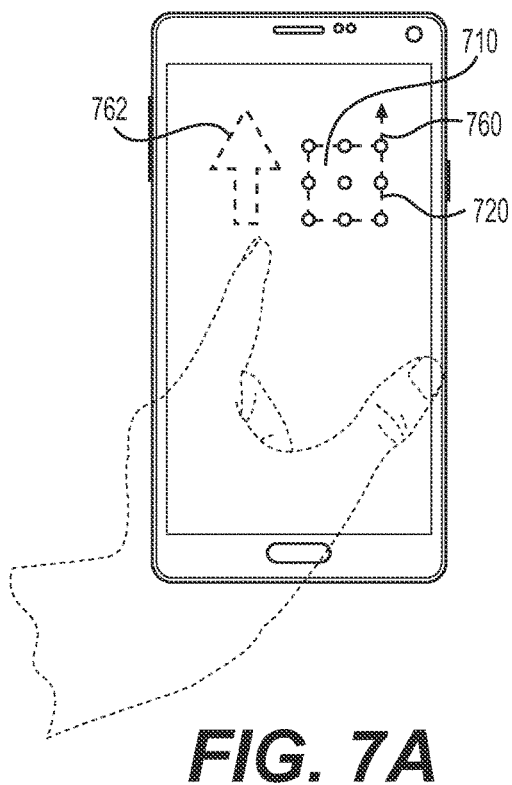
FIGS. 7A-7D illustrate yet another example of a single-touch interaction for setting a screen orientation of an electronic device.
Figure 7B:
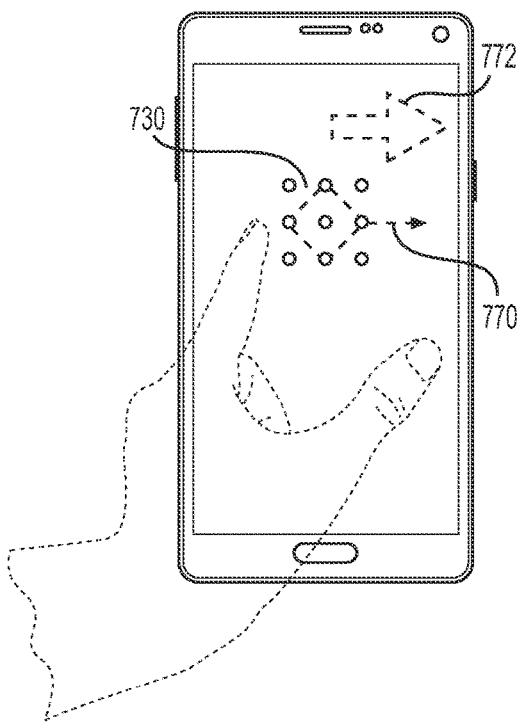
Figure 7C:
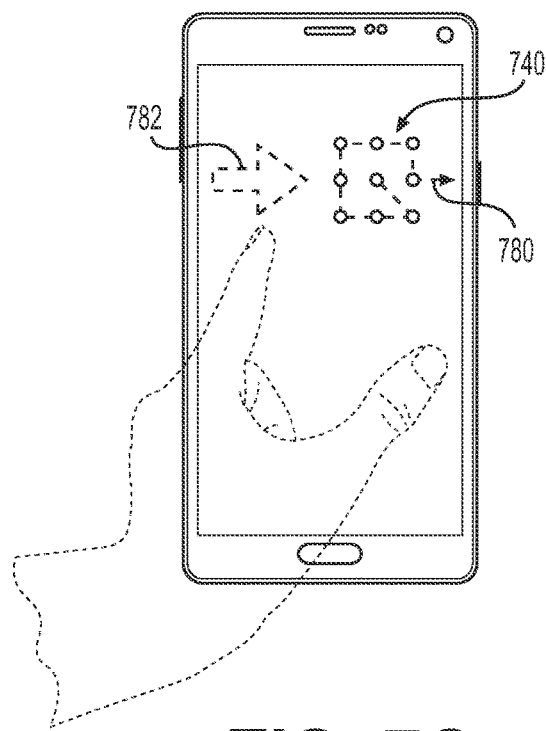
Figure 7D:
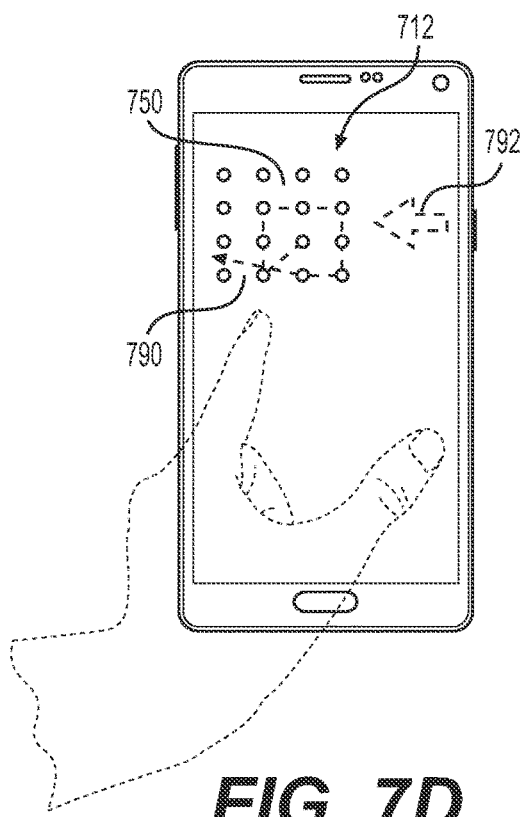

In particular embodiments, as shown in FIGS. 6A-6C, display screen 110 may include a plurality of visual cues as a plurality of dots 610 (e.g., a four by four grid of dots) that indicate where a swipe pattern may be drawn by the user. As an example and not by way of limitation, the swipe pattern may be preset by electronic device 100, the user, a third party, any other suitable entity, or any combination thereof. As an example and not by way of limitation, as shown in FIG. 6A, electronic device 100 determines that the screen orientation before the transition from the first state to the second state (e.g., before the unlocking of electronic device 100) is set according to a direction of arrow 620 (i.e., display screen 110 was previously set to a display orientation according to the "up" direction). Then, as shown in FIG. 6B, the user may swipe according to pattern 630 (e.g., an octagonal pattern) that touches (or substantially touches) one or more of the plurality of dots 610. Then, as shown in FIG. 6C, once the user completes the swipe according to pattern 630, the device is unlocked and can transition from the first state to the second state. In particular embodiments, as shown in FIG. 6D, if the user does not wish to change the screen orientation from the previously-set screen orientation, the user may end the touch interaction, resulting in the screen orientation of display screen 110 to remain set according to the direction of arrow 620 (i.e., the screen orientation does not change from the previously-determined orientation). However, as shown in FIG. 6E, if the user continues the swiping motion after the swiping motion for pattern 630 is complete, the screen orientation of display screen 110 may be set according to an orientation-setting swiping motion 640 connected to and following the swiping motion for pattern 650. As an example and not by way of limitation, if the direction of orientation-setting swiping motion 640 is toward the left part of display screen 110, the screen orientation of electronic device 100 in the second state may be set such that the left direction is an "up" direction. In addition, as an example and not by way of limitation, as shown in FIGS. 7A and 7B, when display screen includes a plurality of visual cues as a three by three grid of dots 710, and a swipe pattern is preset as a square shape, electronic device 100 may accept both a swipe pattern 720 in the shape of a square (FIG. 7A) or a swipe pattern 730 in the shape of a diamond (FIG. 7B). As an example and not by way of limitation, as shown in FIG. 7C, a swipe pattern may include a swipe pattern 740 that touches (or substantially touches) all of the dots of the three by three grid of dots 710. Alternatively, as shown in FIG. 7D, a swipe pattern may include a swipe pattern 750 based on a predetermined pattern (e.g., a pattern covering all dots of a three by three grid only) that may touch (or substantially touch) any portion (e.g., any applicable dots) of a larger grid 712 (e.g., a four by four grid of dots). In addition, as discussed above, if the user continues the swiping motion after the swiping motion for swipe patterns 720, 730, 740, and 750 are complete, the screen orientation of display screen 110 may be set according to this additional orientation-setting swiping motion connected to and following the swipe patterns 720, 730, 740, and 750. Thus, as shown in FIG. 7A, when the direction of first orientation-setting swiping motion 760 is toward the top part of display screen 110, the screen orientation of display screen 110 in the second state may be set according to a direction of first arrow 762 (i.e., setting the screen orientation according to an "up" direction). As shown in FIG. 7B, when the direction of second direction orientation-setting swiping motion 770 is toward a right part of display screen 110, the screen orientation of display screen 110 in the second state may be set according to a direction of second arrow 772 (i.e., setting the screen orientation according to an "right" direction). As shown in FIG. 7C, when the direction of third direction orientation-setting swiping motion 780 is toward a right part of display screen 110, the screen orientation of display screen 110 in the second state may be set according to a direction of third arrow 782 (i.e., setting the screen orientation according to an "right" direction). As shown in FIG. 7D, when the direction of fourth direction orientation-setting swiping motion 790 is toward a left part of display screen 110, the screen orientation of display screen 110 in the second state may be set according to a direction of fourth arrow 792 (i.e., setting the screen orientation according to an "left" direction). Although this disclosure describes a particular swiping motion to correspond to a particular screen orientation, this disclosure contemplates employing any suitable swiping motion to correspond to any suitable screen orientation.

Figure 8A:
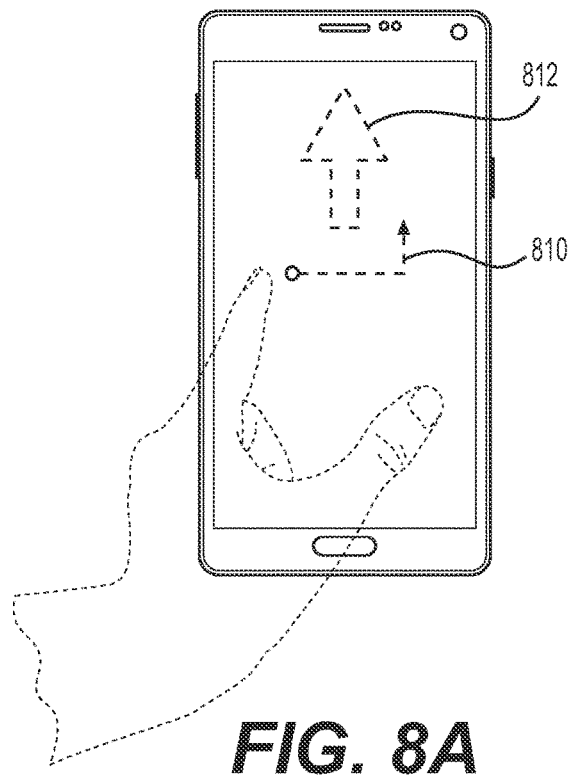
FIGS. 8A-8D illustrate yet another example of a single-touch interaction for setting a screen orientation of an electronic device.
Figure 8B:
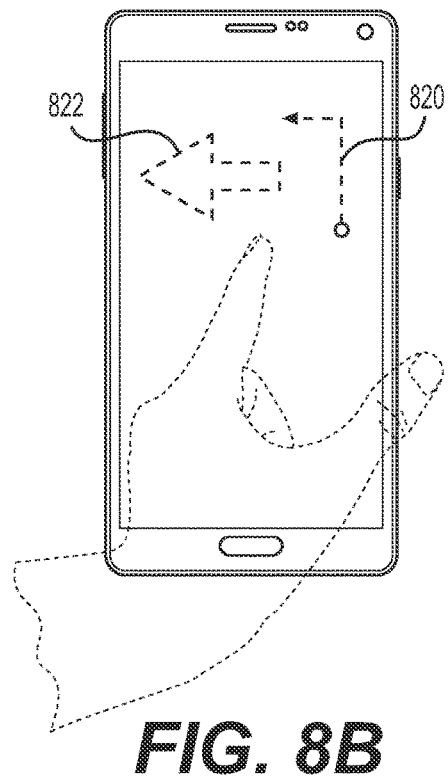
Figure 8C:
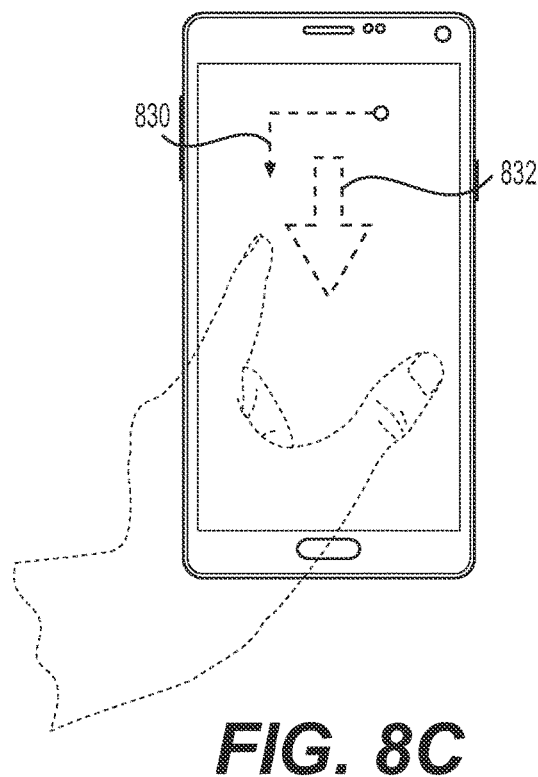
Figure 8D:
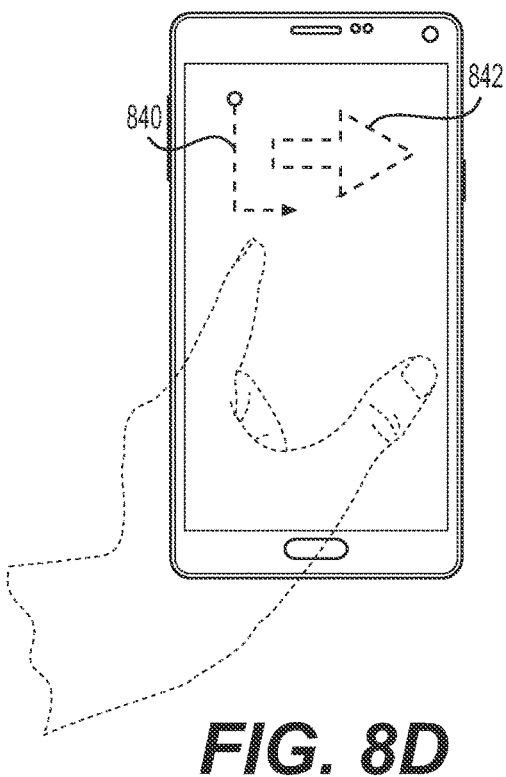

In particular embodiments, as shown in FIGS. 8A-8D, even when no visual cues are displayed on display screen 110, an end portion (e.g., an end tail) of a swipe pattern 810 may determine the display orientation of display screen 110 in the second state. As shown in FIG. 8A, an end portion of a first swiping motion 810 that moves in a direction toward a top part of display screen 110 (i.e., portion 180) may correspond to setting the screen orientation according to a direction of arrow 812 (i.e., setting the screen orientation according to an "up" direction). As shown in FIG. 8B, an end portion of a second swiping motion 820 that moves in a direction toward a left part of display screen 110 (i.e., portion 182) may correspond to setting the screen orientation according to a direction of arrow 822 (i.e., setting the screen orientation according to a "left" direction). As shown in FIG. 8C, an end portion of third swiping motion 830 that moves in a direction toward a bottom part of display screen 110 (i.e., portion 186) may correspond to setting the screen orientation according to a direction of arrow 832 (i.e., setting the screen orientation according to a "down" direction). As shown in FIG. 8D, an end portion of fourth swiping motion 840 that moves in a direction toward a right part of display screen 110 (i.e., portion 184) may correspond to setting the screen orientation according to a direction of arrow 842 (i.e., setting the screen orientation according to a "right" direction). Although this disclosure describes a particular swiping motion to correspond to a particular screen orientation, this disclosure contemplates employing any suitable swiping motion to correspond to any suitable screen orientation.

Examples of Multi-Touch Interactions

Figure 9A:
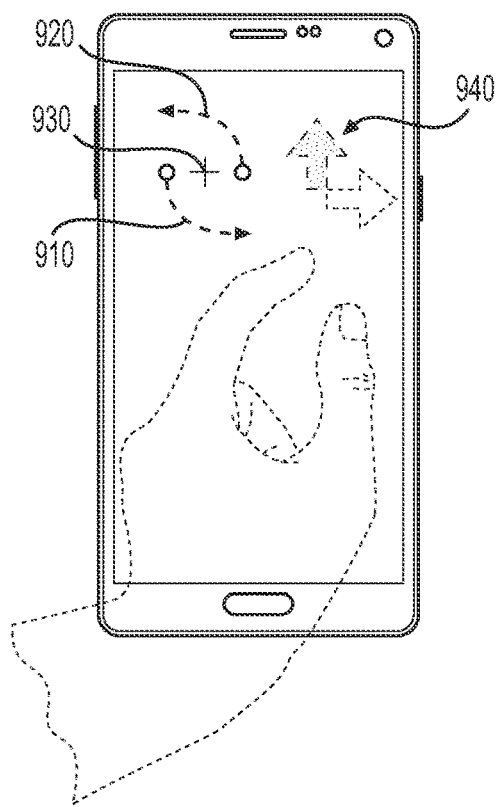
FIGS. 9A and 9B illustrate an example of a multi-touch interaction for setting a screen orientation of an electronic device.
Figure 9B:
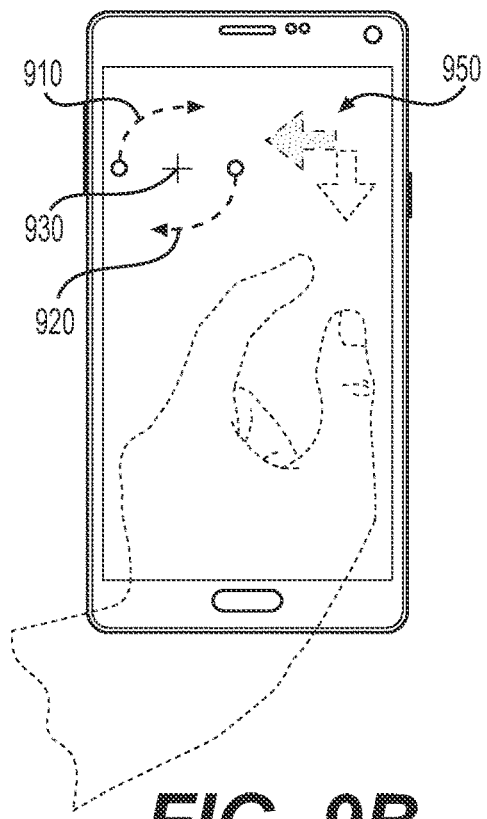

In particular embodiments, the gesture may include a multi-touch interaction of the user with the display screen that is associated with setting the screen orientation of electronic device 100. As an example and not by way of limitation, a multi-touch interaction may include a user interaction in which at least two fingers of the user interacts with the display screen. FIGS. 9A-11D illustrates examples of a multi-touch interaction for setting a screen orientation of an electronic device. In particular embodiments, a multi-touch interaction may be used to differentiate between setting a new screen orientation and using the default screen orientation when electronic device 100 transitions to the second state. As an example and not by way of limitation, a single-touch interaction may be mapped to the default screen orientation and a multi-touch interaction may be mapped to setting a new screen orientation when electronic device 100 transitions to the second state, or vice versa. In particular embodiments, as shown in FIGS. 9A and 9B, the multi-touch interaction may include a user touching at least two points 910, 920 with at least two fingers on display screen 110 of electronic device 100 and then swiping the fingers to rotate about a central axis 930 in a clockwise manner, a counter clockwise manner, or a combination thereof. As an example and not by way of limitation, the fingers may swipe/rotate an equal or substantially equal distance. In particular embodiments, electronic device 100 may transition to the second state (e.g., may be unlocked) when the angle of rotation reaches a predetermined value (e.g., set by electronic device 100, the user, a third party, or any other suitable entity), the touch is released, other suitable end point, or any combination thereof. As an example and not by way of limitation, the angle of rotation may be 45 degrees, 60 degrees, 90 degrees, 120 degrees, 180 degrees, or any other suitable angle of rotation. As an example and not by way of limitation, the screen orientation may be determined by the direction of rotation, the location of the touch points upon release, other suitable parameter, or any combination thereof. In particular embodiments, when the user touches display screen 110 at points 910, 920 and swipes his fingers to rotate about central axis 930, visual feedback indicating the changing of the screen orientation may be shown. As an example and not by way of limitation, as shown in FIGS. 9A and 9B, visual feedback mechanisms 940 and 950 may each show a dotted arrow to represent the default screen orientation, and as the user swipes/rotates his fingers around central axis 930, the dotted arrow may slowly become darker in color to show the resulting changed screen orientation, which the user may use as a visual cue to determine when to stop the swipe/rotation of his fingers to set the final screen orientation. Although this disclosure describes a particular multi-touch user interaction to correspond to a particular screen orientation, this disclosure contemplates employing any suitable multi-touch user interaction to correspond to any suitable screen orientation.

Figure 10A:
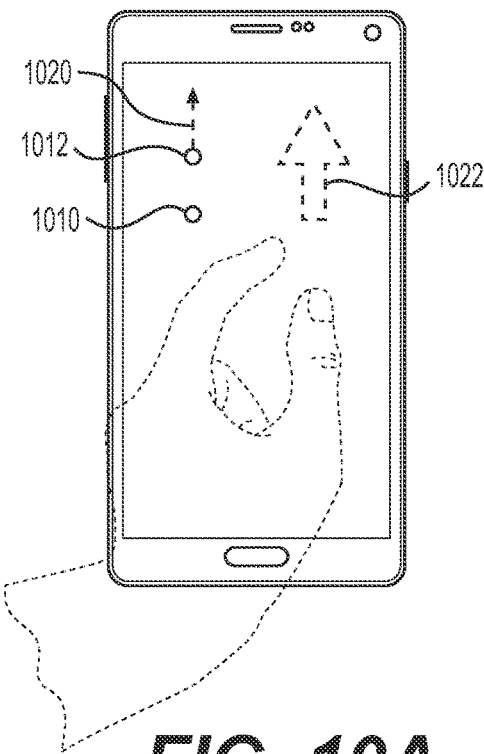
FIGS. 10A-10D illustrate another example of a multi-touch interaction for setting a screen orientation of an electronic device.
Figure 10B:
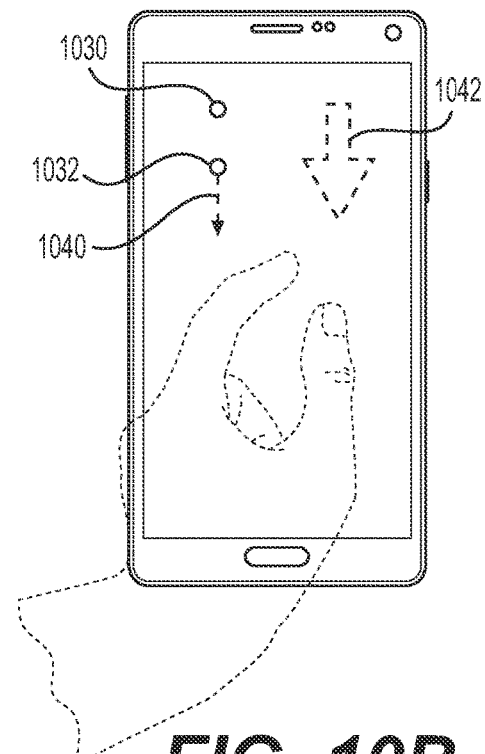
Figure 10C:
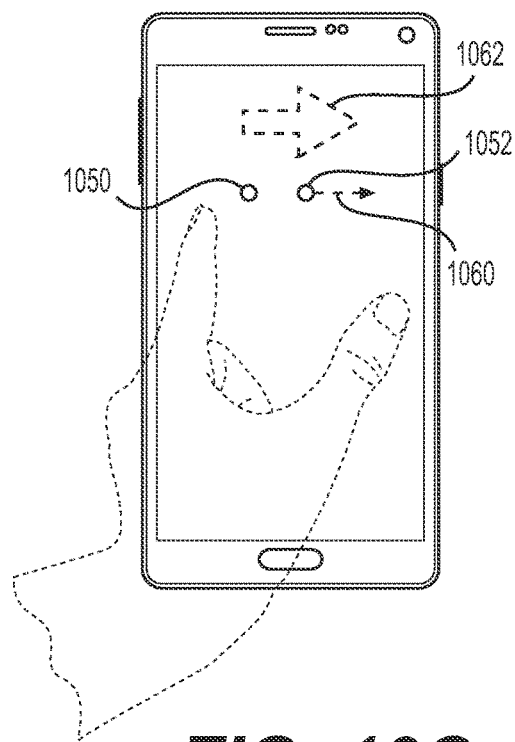
Figure 10D:
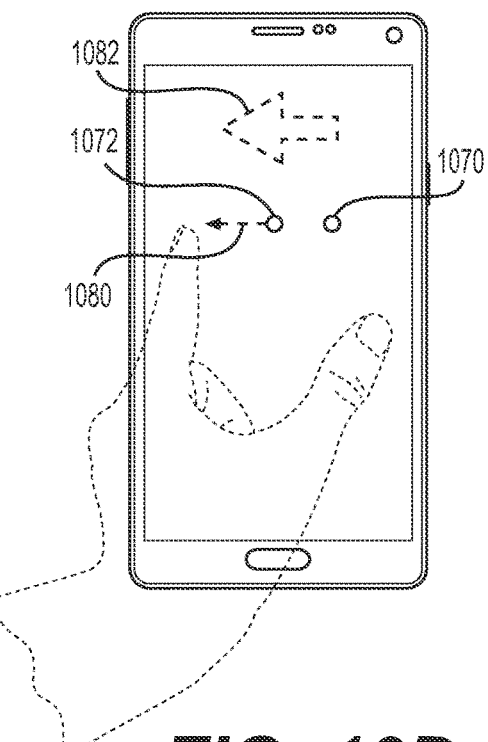

In particular embodiments, a multi-touch interaction may include a user touching at least two points with at least two fingers on display screen 110 and then moving one of the two fingers a greater distance than the other finger. As an example and not by way of limitation, as shown in FIG. 10A, the user may touch display screen 110 at points 1010 and 1012, and then keep the touch at point 1010 substantially stationary while moving the touch at point 1012 in a swiping motion in a direction 1020 (e.g., the "up" direction) away from the location of point 1010. In particular embodiments, the substantially stationary point (e.g., point 1010) may be used as a point of origin for an arrow that extends out to the moving point (e.g., point 1012). In particular embodiments, the transitioning of electronic device 100 from the first state to the second state (i.e., the unlocking of the device) may be triggered when a distance between the two points of contact on display screen 110 (e.g., between point 1010 and the end point of point 1012 after traveling in direction 1020) is equal to or greater than a predetermined length. This predetermined length may be, for example, preset by the device, the user, a third party, other suitable entity, or any combination thereof. In particular embodiments, the direction of the arrow formed by the point of origin of the substantially stationary point and the moving point may determine a screen orientation of display screen 110 after electronic device 100 transitions to the second state. As an example and not by way of limitation, as shown in FIG. 10A, direction 1020 indicating the direction of movement of point 1012 corresponds to an "up" direction, and thus the screen orientation of display screen 110 is set according the direction of arrow 1022 (i.e., to the "up" direction). As an example and not by way of limitation, as shown in FIG. 10B, initial touch at point 1030 remains substantially stationary while the touch at point 1032 moves in a "down" direction 1040, and thus the screen orientation of display screen 110 is set according to the direction of arrow 1042 (i.e., to the "down" direction as corresponding to an "up" orientation). As an example and not by way of limitation, as shown in FIG. 10C, initial touch at point 1050 remains substantially stationary while the touch at point 1052 moves in a "right" direction 1060, and thus the screen orientation of display screen 110 is set according to the direction of arrow 1062 (i.e., to the "right" direction as corresponding to an "up" orientation). As an example and not by way of limitation, as shown in FIG. 10D, initial touch at point 1070 remains substantially stationary while the touch at point 1072 moves in a "left" direction 1080, and thus the screen orientation of display screen 110 is set according to the direction of arrow 1082 (i.e., to the "left" direction as corresponding to an "up" orientation). Although this disclosure describes a particular multi-touch user interaction to correspond to a particular screen orientation, this disclosure contemplates employing any suitable multi-touch user interaction to correspond to any suitable screen orientation.

Figure 11A:
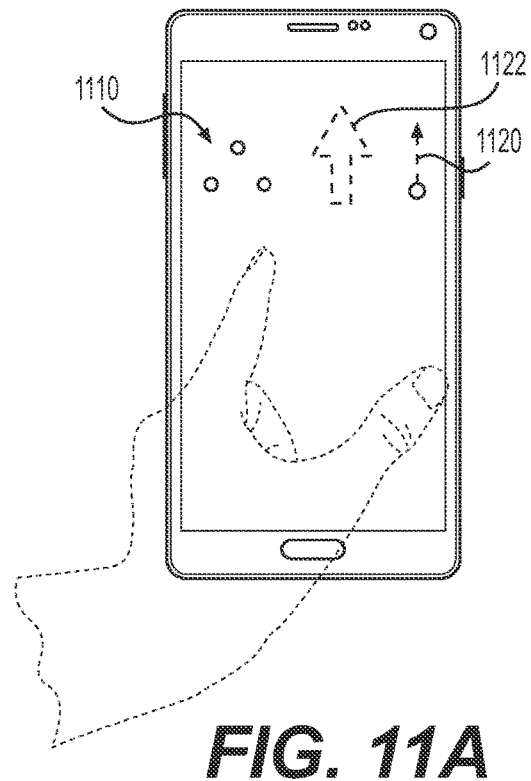
FIGS. 11A-11D illustrate yet another example of a multi-touch interaction for setting a screen orientation of an electronic device.
Figure 11B:
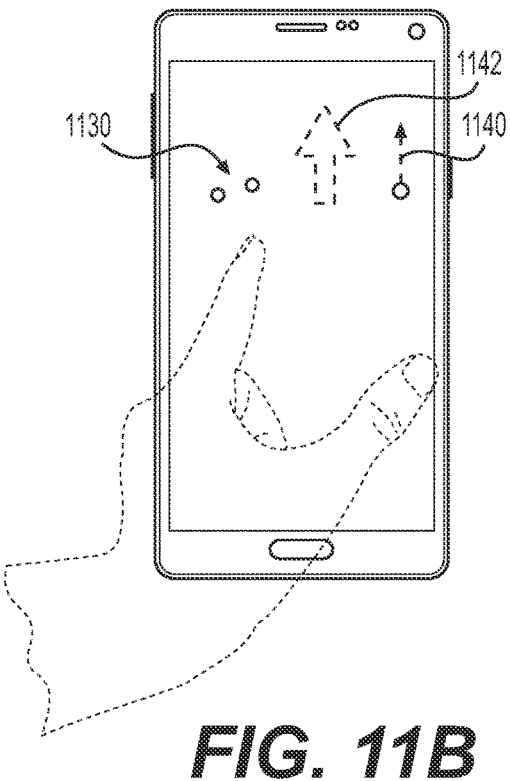
Figure 11C:
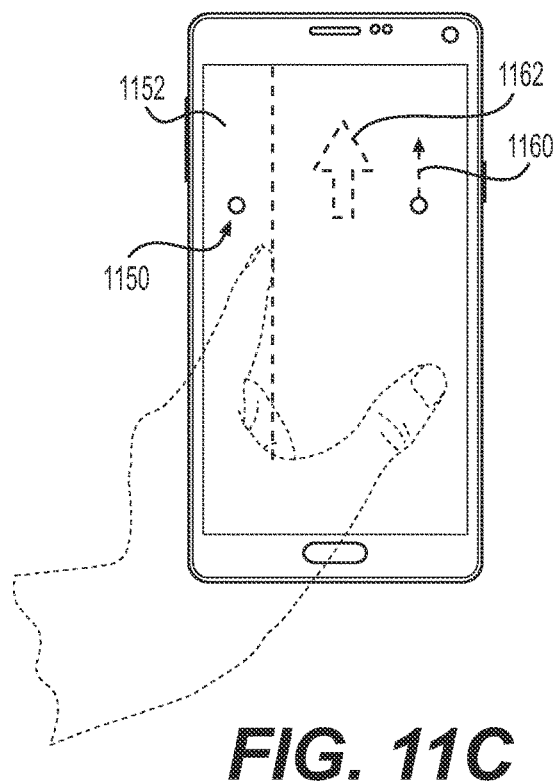
Figure 11D:
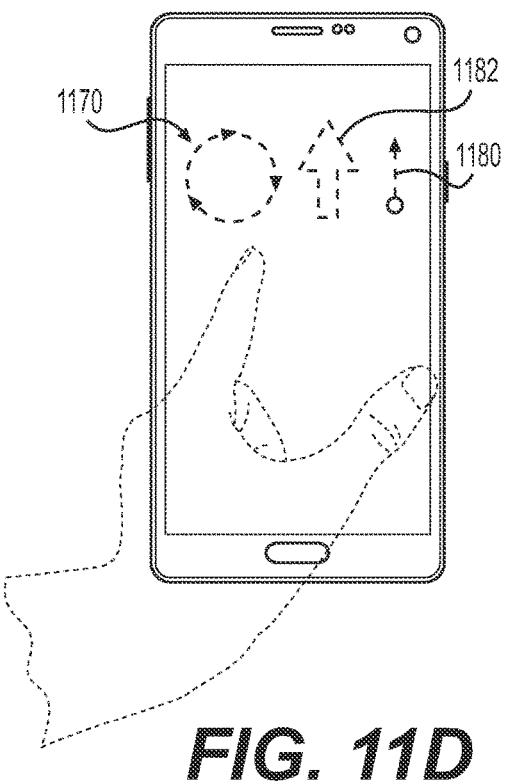

In particular embodiments, the multi-touch interaction may include a two-part interaction, where the first part of the interaction is separate from the second part (e.g., the user lifts up his finger(s) from the display screen between the first part and the second part of the interaction). In particular embodiments, the first part of the interaction may be an initial touch interaction that indicates that the user want to set a new screen orientation, and the second part of the interact may be a swipe interaction that indicates the screen orientation the user want to set for the second state of electronic device 100 (i.e., the screen orientation after the device is unlocked). As an example and not by way of limitation, as shown in FIG. 11A, an initial first interaction may include a multi-touch interaction 1110 with three fingers of the user touching display screen 110 and then lifting up to indicate to electronic device 100 that the user wants to set a new screen orientation, followed by a second interaction of a swipe 1120 in an "up" direction to set the screen orientation of display screen 110 according to the direction of arrow 1122 (i.e., to the "up" direction). As an example and not by way of limitation, as shown in FIG. 11B, an initial first interaction may include a multi-touch interaction 1130 with two fingers of the user touching display screen 110 and then lifting up to indicate to electronic device 100 that the user wants set a new screen orientation, followed by a second interaction of a swipe 1140 in an "up" direction to set the screen orientation of display screen 110 according to the direction of arrow 1142 (i.e., to the "up" direction). As an example and not by way of limitation, as shown in FIG. 11C, an initial first interaction may include a single-touch interaction 1150 with one finger of the user touching display screen 110 and then lifting up to indicate to electronic device 100 that the user wants to set a new screen orientation, followed by a second interaction of a swipe 1160 in an "up" direction to set the screen orientation of display screen 110 according to the direction of arrow 1162 (i.e., to the "up" direction). In particular embodiments, a predefined orientation-setting region 1152 may be displayed on display screen 110, and the single-touch interaction 1150 may be located in region 1152 for electronic device 100 to recognize the single-touch interaction as an indication that the user wants to set a new screen orientation. As an example and not by way of limitation, as show in FIG. 11D, an initial first interaction may include a swipe interaction 1170 (e.g., a circular motion gesture) with one finger of the user touching display screen 110 and then lifting up after completing the swipe interaction to indicate to electronic device 100 that the user wants to set a new screen orientation, followed by a second interaction of a swipe 1180 in an "up" direction to set the screen orientation of display screen 110 according to the direction of arrow 1182 (i.e., to the "up" direction). Although this disclosure describes a particular multi-touch or single-touch user interaction to correspond to a particular screen orientation, this disclosure contemplates employing any suitable multi-touch or single touch user interaction to correspond to any suitable screen orientation.

In particular embodiments, display screen 110 may provide instructions either before and/or during the single-touch or multi-touch user interaction, in addition to feedback during the unlocking process, in order to aid the user in completing the unlocking interaction. As an example and not by way of limitation, this may include visual feedback, for example, showing the screen rotating along with the user interaction (e.g., as discussed above), showing arrows to instruct the user which direction the unlocked screen will be after the user interaction (e.g., as discussed above), showing the requisite distance of user movement (e.g., a threshold swiping motion) required in a specified direction to unlock the screen (e.g., as discussed above), changing opacity (e.g., decreasing opacity) to show how much more/further user movement is needed to set new screen orientation, any other suitable feedback methods, or any combination thereof. As an example and not by way of limitation, this may also include haptic feedback, for example, vibration of electronic device 100 as a notification to the user that a new screen orientation is set (e.g., different vibrations sequences that may be predefined to map to different screen orientations, devices with multiple vibration points that can be separately activated depending on the determined final screen orientation, other suitable haptic feedback methods, or any combination thereof).

In particular embodiments, when the direction of the user's swipe is within a threshold degree of difference from an established/preset single-touch or multi-touch interaction for transitioning the device from the first state to the second state to unlock electronic device 100 (e.g., the user's touch interaction is not completely parallel with a side of the device, the user's touch interaction does not completely or substantially match a predefined swipe location, distance, or pattern, the user's touch interaction does not completely or substantially touch all of the one or more requisite visual cues), the device may determine that the single-touch or multi-touch interaction is sufficient to unlock the device and establish screen orientation. As an example and not by way of limitation, this may be determined based on the direction of the user's touch interaction being within a predetermined threshold degree of difference (e.g., a swipe within 30 degrees of one direction will be determined to be a swipe in that direction), the location of the user's touch interaction being within a predetermined threshold distance from a preset starting and/or ending position, the pattern of the user's touch interaction being within a predetermined threshold pattern, other suitable differences, or any combination thereof. The threshold degree of difference may be defined and/or adjusted by the device, the user, a third party, other suitable entity, or any combination thereof. Although this disclosure describes particular threshold error determinations, this disclosure contemplates employing any suitable threshold error determinations.

Method Overview

Figure 12:
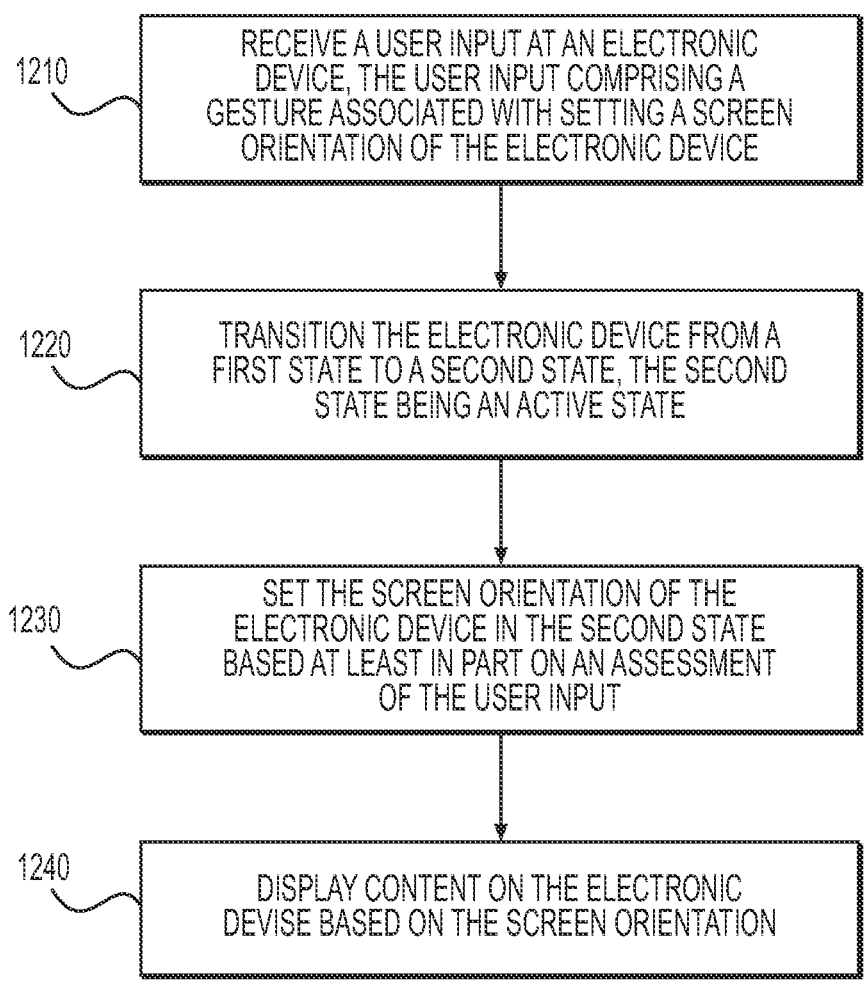
FIG. 12 illustrates an example method for determining display orientation.

FIG. 12 illustrates an example method 1200 for determining display orientation. The method may begin at step 1210, where electronic device 100 may receive a user input that includes a gesture associated with setting a screen orientation of electronic device 100. As discussed above, the gesture may include a single-touch interaction, a multi-touch orientation, any other suitable interaction, or any combination thereof. In particular embodiments, electronic device 100 may be configured to recognize orientation-specific user input when entered from any one of a plurality of orientations. As discussed above, the user input may indicate to electronic device 100 what screen orientation to display content, and may be entered from any direction and/or location around the position of electronic device 100. At step 1220, electronic device 100 may transition from a first state to a second state. In particular embodiments, the first state may be an inactive state (discussed above), an unlock screen state (discussed above), other suitable state prior to the second state, or any combination thereof. In particular embodiments, the second state may be an active state (discussed above). At step 1230, electronic device 100 may set the screen orientation in the second state based at least in part on an assessment of the user input. Then, in step 1240, electronic device 100 displays content to the user on display screen 110 based on the screen orientation. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for determining screen orientation based on the particular steps of the method of FIG. 12, this disclosure contemplates any suitable method for determining screen orientation based on any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Overview of the Computer System

Figure 13:
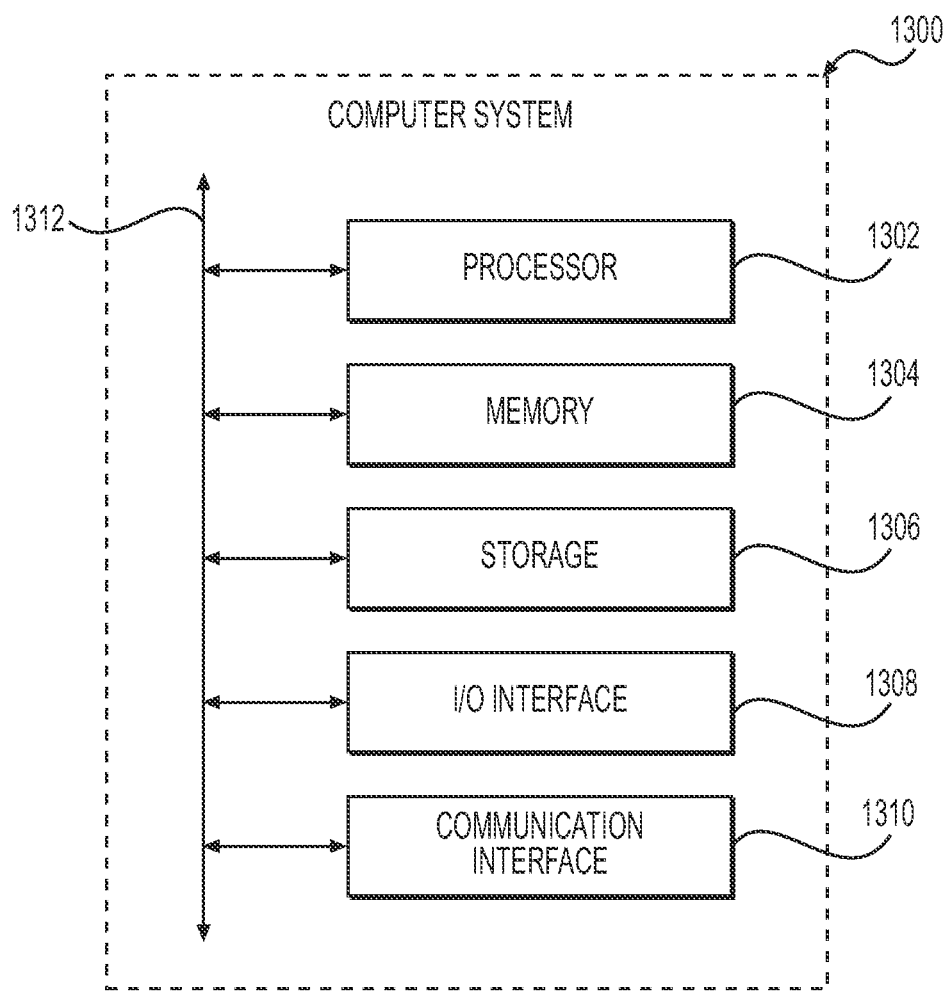
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a user input at a lock screen of an electronic device, the user input comprising an unlock gesture unlocking the device and specifying a screen orientation of the electronic device, wherein the electronic device is configured to recognize orientation-specific user input when entered from any one of a plurality of orientations, wherein:
     the unlock gesture unlocking the device and specifying the screen orientation comprises a movement of a first finger concurrent with a stationary touch of a second finger of the user on a display screen of the electronic device; and
     the screen orientation is specified by a direction of the movement of the first finger relative to the second finger;
   transitioning, based on the unlock gesture, the electronic device from a lock state to a unlock state;
   setting the screen orientation of the electronic device in the second state based at least in part on the screen orientation specified by the unlock gesture; and
   after transitioning the electronic device to the unlock state, displaying content on the electronic device according to the screen orientation specified at least in part by the unlock gesture.

2. The method of claim 1, further comprising, prior to receiving the user input at the electronic device, determining that the screen orientation of the electronic device cannot be accessed from at least a sensor of the electronic device.

3. The method of claim 1, wherein the unlock gesture further comprises the at least two fingers of the user moving a threshold distance rotating about a central axis.

4. The method of claim 1, wherein the gesture further comprises:
   a first interaction in which one or more fingers of the user touch the display screen to transition the electronic device from the first state to the second state, and
   a second interaction in which one or more fingers of the user touch the display screen to set the screen orientation of the electronic device,
   wherein the first interaction is separate from the second interaction.

5. The method of claim 1, further comprising, following the setting of the screen orientation, displaying an indication of the setting of the screen orientation, the indication comprising a visual indication, a haptic indication, or any combination thereof.

6. The method of claim 1, wherein the lock screen prohibits access to the content on the electronic device.

7. The method of claim 6, wherein the unlock state is an active state in which the content of the electronic device is displayed on the screen of the device for user interaction.

8. The method of claim 1, wherein the lock state is a state in which the electronic device is in a suspended-action mode.

9. The method of claim 1,
   wherein the unlock gesture follows a pre-determined gesture,
   wherein when it is determined that the unlock gesture deviates from the pre-determined gesture in at least one of a direction, a location, and a pattern of the gesture, the screen orientation is set based on the user input only when the deviation is within a threshold amount; and
   wherein the threshold amount is preset by the portable device, predefined by the user, or any combination thereof.

10. The method of claim 1, wherein:
    prior to the unlock gesture, a distance between the first finger and the second finger is within a predetermined threshold distance; and
    the unlock gesture further comprises a movement of the first finger such that a distance between the first finger and the second finger exceeds the predetermined threshold distance.

11. One or more computer-readable non-transitory storage media embodying software that is operable when executed to:
    receive a user input at a lock screen of an electronic device, the user input comprising an unlock gesture unlocking the device and specifying a screen orientation of the electronic device, wherein the electronic device is configured to recognize orientation-specific user input when entered from any one of a plurality of orientations, wherein:
  the unlock gesture unlocking the device and specifying the screen orientation comprises a movement of a first finger concurrent with a stationary touch of a second finger of the user on a display screen of the electronic device; and
  the screen orientation is specified by a direction of the movement of the first finger relative to the second finger;
transition, based on the unlock gesture, the electronic device from a lock state to a unlock state;
set the screen orientation of the electronic device in the second state based at least in part on the screen orientation specified by the unlock gesture; and
after transitioning the electronic device to the unlock state, display content on the electronic device according to the screen orientation specified at least in part by the unlock gesture.

12. A system comprising: one or more processors; and a non-transitory memory coupled to the processors comprising instructions executable by the processors, the processors operable when executing the instructions to:
  receive a user input at a lock screen of an electronic device, the user input comprising an unlock gesture unlocking the device and specifying a screen orientation of the electronic device, wherein the electronic device is configured to recognize orientation-specific user input when entered from any one of a plurality of orientations, wherein:
    the unlock gesture unlocking the device and specifying the screen orientation comprises a movement of a first finger concurrent with a stationary touch of a second finger of the user on a display screen of the electronic device; and
    the screen orientation is specified by a direction of the movement of the first finger relative to the second finger;
  transition, based on the unlock gesture, the electronic device from a lock state to a unlock state;
  set the screen orientation of the electronic device in the second state based at least in part on the screen orientation specified by the unlock gesture; and
  after transitioning the electronic device to the unlock state, display content on the electronic device according to the screen orientation specified at least in part by the unlock gesture.

\* \* \* \* \*